United States Patent [19]

Comfort et al.

[11] 3,713,096

[45] Jan. 23, 1973

[54] SHIFT REGISTER INTERCONNECTION OF DATA PROCESSING SYSTEM

[75] Inventors: Webb T. Comfort, Wappingers Falls; George Radin, Piemont, both of N.Y.

[73] Assignee: International Business Machines Corporation, Armonk, N.Y.

[22] Filed: March 31, 1971

[21] Appl. No.: 129,747

[52] U.S. Cl. .......................................340/172.5

[51] Int. Cl. ..........................G06f 13/00, G06f 15/16

[58] Field of Search .........340/172.5; 328/43, 44, 45; 307/221, 223

[56] References Cited

UNITED STATES PATENTS

| | | | |
|---|---|---|---|
| 3,239,764 | 3/1966 | Verma et al. | 340/172.5 X |
| 3,475,733 | 10/1969 | Gaines et al. | 340/172.5 X |
| 3,473,160 | 10/1969 | Wahlstrom | 340/172.5 |
| 3,350,689 | 10/1967 | Underhill | 340/172.5 |
| 3,311,896 | 3/1967 | Delmege | 340/172.5 |
| 3,274,556 | 9/1966 | Paul et al. | 340/172.5 |
| 3,253,261 | 5/1966 | Marsh et al. | 328/43 X |

*Primary Examiner*—Gareth D. Shaw
*Assistant Examiner*—John P. Vandenburg
*Attorney*—Hanifin and Jancin and W. S. Robertson

[57] ABSTRACT

Units of a data processing system send and receive messages by means of a ring connection of shift register stages. One unit places a message with suitable control bits in an associated shift register stage of the ring and after a series of shifts, the destination unit receives the message at its stage of the ring. The invention overcomes the problem that a message from a downstream unit to a nearby upstream unit is ordinarily required to be shifted almost entirely around the ring with a delay introduced at each stage of the ring. Some of the units are connected to enter messages at register stages upstream of other units and to receive messages at register stages downstream of the other units. Units connected in this configuration have shortened data paths in either direction of communication. Several useful configurations are disclosed.

3 Claims, 1 Drawing Figure

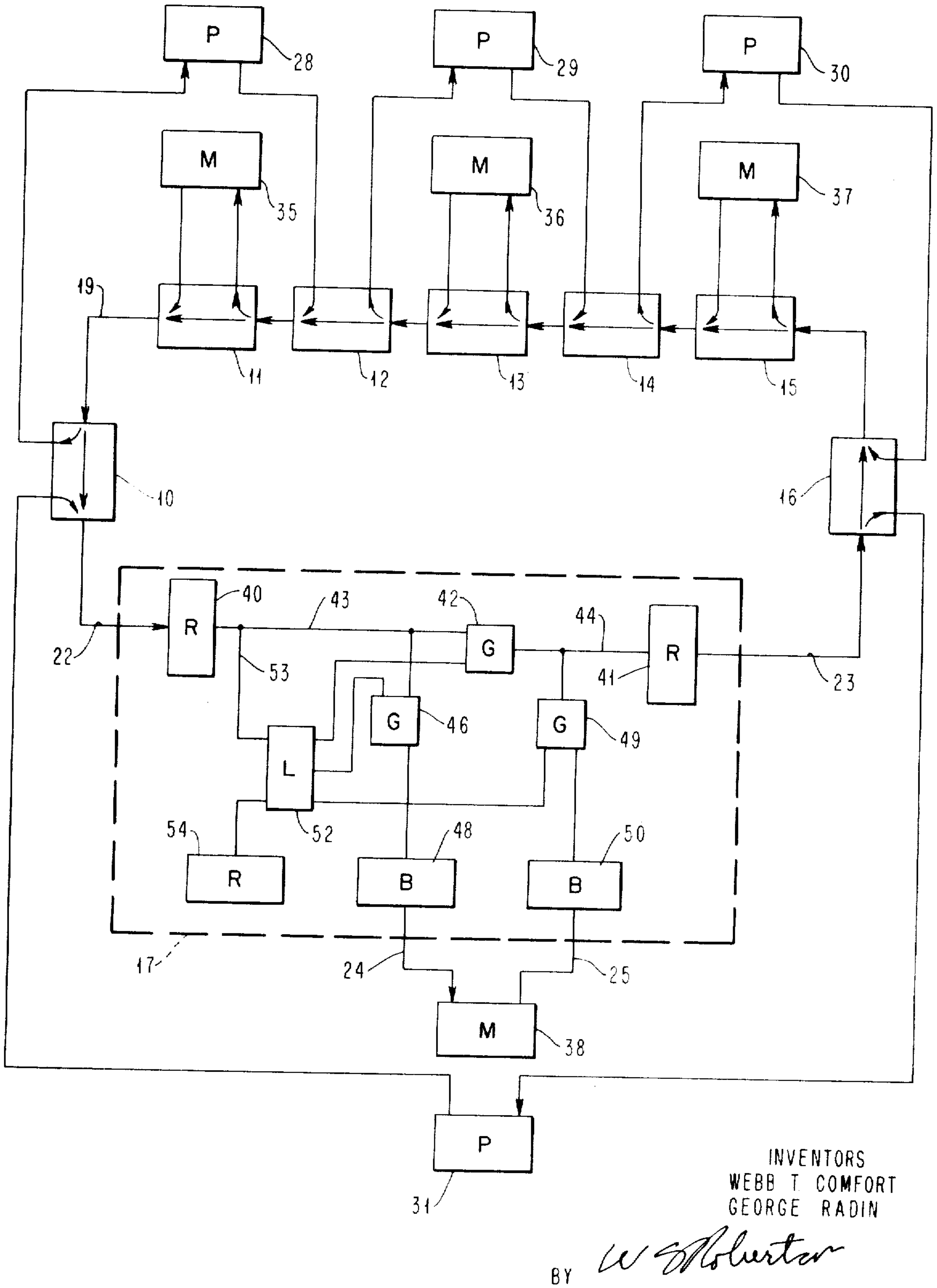
INVENTORS
WEBB T. COMFORT
GEORGE RADIN
BY W. S. Robertson
ATTORNEY

SHIFT REGISTER INTERCONNECTION OF DATA PROCESSING SYSTEM

INTRODUCTION

One system for communication between units of a data processing system has shift registers connected in a ring. Each shift register stage receives messages from a register stage immediately upstream and transmits messages to a register stage immediately downstream. A unit of the data processing system places a message in the associated stage of the ring and the message is shifted from stage to stage until it reaches the stage of the destination unit. The destination unit reads the message and it may place a response message on the ring to be shifted to the originator of the first message. In the system as it has been described so far, the original message and the response message together make a complete circuit around the ring. Thus, if the first unit is located upstream of the second unit by only a few stages, a message is transmitted rapidly from the first unit to the second unit, but a message is transmitted with more delay from the second unit to the first unit. A particular unit can be located with respect to another unit to have a short upstream path or a short downstream path, but not both. One object of this invention is to provide a new and improved organization for a ring interconnection system in which these delays may be shortened in both the upstream and the downstream direction. A related object of the invention is to maintain the simple shift register arrangement of the prior art that has just been described in which the ring shifts in only one direction.

THE INVENTION

According to this invention, selected units of a data processing system receive inputs and produce outputs at spaced apart points on a ring of shift register stages. Other units have their input and output connections to the intervening register stages. With this arrangement, two units can have their input and output connections closer together than in the conventional arrangement already described.

Preferably, some of the units have their inputs from the ring connected upstream of their outputs to the ring without intervening connections by other units, as is conventional. Other units have their outputs to the ring connected upstream and their inputs from the ring connected downstream with other units. connected to intervening register stages. With this arrangement, selected units are given a minimum or an optimum path for data flow in either direction. In specific examples that will be discussed later, memories that are particularly associated with one or more processors but are accessible by other processors are conventionally connected to nearby register stages. The processors particularly associated with these memories are connected to produce outputs upstream of the memories and to receive inputs downstream of the memories. Thus, these processors communicate with these memories through only a few stages of the ring and they communicate with other elements of the system through a data path that is only slightly longer than in a conventional system.

Ordinarily, these units will be interconnected along a segment of the ring that is short in relation to the entire length of the ring so that the terms "upstream" and "-downstream" are unambiguous.

The drawing shows a specific configuration of this invention and illustrates several others. One feature of these configurations is that they retain the simple arrangement of the prior art in which the ring shifts in only one direction. Another feature of these configurations is that each register stage may be identical to every other register stage so that a system can be easily changed or expanded.

Other objects and features of the invention will be apparent from the description of the specific embodiment of the drawing.

THE DRAWING

The drawing shows a specific example of the shift register interconnection system of this invention.

THE SYSTEM OF THE DRAWING

It will be helpful to consider first the conventional aspects of the system of the drawing, including the general data flow and the storage and gating components of a shift register stage. The drawing shows a group of register and gating stages 10 – 17 that are interconnected in a ring. Processors, memories, or other units 28 – 31 and 35 – 38 of a data processing system are interconnected by means of the ring. Shift register stage 17 is identical to the other stages and is shown in detail and will be described later. In the block diagram representation of the other stages, arrowed lines show the flow of data in and out of the stages. Thus, for example, a message flows from stage 10 to the immediately downstream stage 17 on a line 22. A message in stage 17 can flow to memory 38 on a line 24 or it can flow through stage 17 to stage 16. A message can also be entered in stage 17 by the memory 38. Similarly, a message from stage 17 to the immediately upstream stage 10 flows through the intervening stages in the sequence 16, 15, 14, 13, 12 and 11. It is a feature of the preferred embodiment of the invention that the interconnection of register stages just described is substantially conventional and that it is substantially independent of the configuration of connections of the register stages to the units, which will be described later.

Register and gating stage 17 has an input register 40 and an output register 41. Register 40 receives an input message on line 22 from an output register of the preceding stage 10, and register 41 applies an output message on line 23 which is applied to the input register of the next stage 16. A gate 42 connects an output line 43 from register 40 to an input line 44 to register 41. Lines 43, 44 and similar lines in the drawing represent a system of physical conductors for transmitting in parallel the bits that make up a message. Gate 42 and similar gates represent a system of gates for controlling the transmission of the individual bits of the message. Such circuits are well known in many forms; the gates of the drawing function as AND gates.

A shift operation takes place simultaneously in each stage of the ring in two steps. In one step, register 40 of stage 17 is isolated from register 41 of stage 17 and receives a message or a vacancy on line 22 from the output register of the preceding stage 10. Similarly, in this step, register 41 supplies a message or a vacancy to the input register of the next stage 16. In the other step, each stage operates independently of the other stages and registers 40, 41 of the stage communicate with each other or with the associated unit 38 of the data processing system, as will be described in detail next.

A message in register 40 has a data portion that is intended to be read or otherwise operated on by the destination unit 38; it also has control bits that give an address of the destination unit, control bits that indicate whether the register has a valid message or a vacancy, and possible other control bits that are not significant to the interconnection system of this invention. For the operations to be described, the destination unit responds only to the data portion of the message and the logic circuits of register stage 17 respond only to the control bits. It will be readily understood that the interconnection system of this invention is useful with gating stages that receive and operate on the data portion of messages and with units arranged to operate on or respond to the control bits.

A gate 46 is controlled to transmit the data portion of a message from line 43 to a buffer 48 that supplies the messages to the associated unit 38. Similarly, a gate 49 transmits messages to line 44 from a buffer 50 that accumulates messages from the unit 38. A logic circuit 52 controls gates 42, 46, and 49 according to the control bits of the message in register 40 and according to the conditions of buffers 48 and 50. The control bits are applied to circuit 52 on a line 53. A register 54 holds the address of unit 38 which is associated with stage 17. (Register 54 may similarly hold other control bits.) Logic circuit 52 compares the address in register 54 with the address on line 53 to detect whether register 40 contains a message addressed to unit 38. Circuit 52 is made up of simple combinatorial logic circuits that can be readily understood from the following description of the operation of the circuit.

When the address on line 52 does not coincide with the address in register 54, or when the address on line 53 coincides with the address in register 54 but buffer 48 is full and therefore can not accept the message from register 40, circuit 52 closes gates 46 and 49 and opens gate 42 to transmit the message from register 40 to register 41 and to bypass buffer 48. If the message in fact was addressed to unit 38, it will be shifted around the ring to again re-enter register 40. When the address on line 53 agrees with the address in register 54 and buffer 48 is not full, gate 46 is opened to transmit the message from register 40 to buffer 48. Ordinarily, messages are addressed to a unique unit of the system and gate 42 is closed to isolate registers 40 and 41. When buffer 50 signals that it is ready to transmit a message to register 41 and either register 40 contains a vacancy or register 40 contains a message addressed to unit 38 and buffer 48 is not full, gate 42 is closed and gate 49 is opened to transmit the message in buffer 50 to register 41. Thus, at the end of the operation just described, register 41 contains either a message from buffer 50, a vacancy or a message from register 40, or a vacancy resulting from the operation of transferring a message in register 40 to buffer 48. The operation of closing gate 42 when gate 46 is opened or a suitable similar operation identifies the contents of register 41 as a vacancy.

The connection of the units of the data processing system to the ring will be described next. It is a feature of the connection configurations of this invention that the register stage 17 which has been described in relation to a single unit 38 connected at its input and output 24, 25 can be used with different units connected to the input and outputs.

THE INTERCONNECTION CONFIGURATION OF THE DRAWING

In the drawing, units 35 – 38 are connected to individual register stages in the simple arrangement already described in detail for register stage 17 and memory 38. Other units 28 – 31 are connected to enter messages at register stages that are upstream of selected ones of units 35 – 38 and to receive outputs that are downstream of these units. Thus, for example, processor 28 is connected to enter messages in register stage 12 which is immediately upstream of register stage 11. Processor 28 receives messages from register stage 10 which is immediately downstream of register stage 11. Thus, a message from processor 28 to memory 35 would be transmitted through register stage 12 by components corresponding to buffer 50, gate 49, line 44 and register 41 in the detailed drawing of stage 17. In stage 11, the message would be identified as being addressed to memory 35 and will be transmitted to memory 35 through components corresponding to register 40, line 43, gate 46 and buffer 48 in register stage 17. A message from memory 35 to processor 28 would similarly be transmitted on line 19 to register stage 10 where the logic and gating circuits would recognize the address and route the message to processor 28. Thus, processor 28 and memory 35 are closely connected for both directions of transmitting messages. In addition, their connections to the ring permit communicating with any other unit of the system. For example, a message from processor 28 to memory 37 is entered in register stage 12 and transmitted in sequence through register stages 11, 10, 17, 16 and through register stage 15 to the memory 37. This path is essentially identical to the path from a unit having both its input and output connected conventionally to register stage 12. A message from memory 37 to processor 28 would be entered in stage 15 and transmitted through stages 14, 13, 12, 11 and 10 to processor 28. This path is essentially the same as if processor 28 were conventionally connected to both the input and output of stage 10. Thus, the delays in transmission between processor 28 and memory 38 are only slightly greater than the delays of a conventional ring connection of similar units. These additional delays depend on the number of register stages, represented by register stage 11, connected between the input and output connections of processor 28, or considered from another standpoint, they depend on the ratio of the length of the segment between the input and output connections of processor 28 and the length of the entire ring. Optimum values can be achieved for the length of the ring, the number of memory or other conventional stages between the input and output connections of a processor, and the percentage of memory accesses that are made by a processor to one of the closely connected memories.

An alternative configuration can be understood from the configuration of the drawing. Where memories 36 and 37 are shown in the drawing, a processor may be connected to apply messages to stage 15 of the ring and to receive messages at stage 13 of the ring. Thus, the added processor would have its input downstream of the output of processor 29 and its output upstream of the input of processor 30. This configuration can be extended to form a ring and intervening ring stages can be provided for other units.

Combinations and extensions of the two disclosed configurations will be readily apparent. Processors, memories, or other components of a data processing system can be connected where either processors or memories have been described in specific embodiments of the invention. Those skilled in the art will recognize a variety of applications and appropriate modifications for this invention within the scope of the claims.

What is claimed is:

1. A ring interconnection system for units of a data processing system, comprising, a plurality of shift register stages interconnected to form a ring in which messages are shifted in a predetermined direction from stage to stage, each of said stages being substantially identical and each having a connection point for receiving messages from a unit of the system and a connection point for transmitting messages to a unit of the system, and means connecting a first and a second of said units to a segment of said ring that is short in relation to the entire length of the ring, said connecting means comprising:

means connecting an output of said first unit to a first point on said segment for receiving messages on said ring from said first unit, means connecting an input of said second unit to a second point on said segment downstream of said first point for transmitting messages from said ring to said second unit, means connecting an output of said second unit to a third point on said segment downstream of said second point for receiving on said ring messages from said second unit, and means connecting an input of said first unit to a fourth point on said segment downstream of said third point for transmitting messages from said ring to said first unit, whereby said first and second units intercommunicate on said segment independently of the other stages of said ring.

2. The system of claim 1 wherein one of said connections of said first unit is at a register stage adjacent the register stage of said second unit.

3. A ring interconnection system for units of a data processing system, comprising, a plurality of shift register stages interconnected to form a ring in which messages are shifted in a predetermined direction from stage to stage, each of said stages being substantially identical and each having a connection point for receiving inputs from a unit of the system and a connection point for transmitting messages to a unit of the system, means connecting a first of said units to enter and receive messages at a first register stage, and means connecting a second of said units to enter messages at a second stage upstream of said first stage and to receive messages at a third stage downstream of said first stage, said second, third, and intervening stages forming a segment of the ring that is short in relation to the entire length of the ring, whereby said first and second units are connected to communicate with units of said ring outside said segment and are connected to intercommunicate on said segment independently of said other stages.

* * * * *